US012170413B2

(12) United States Patent
Park et al.

(10) Patent No.: US 12,170,413 B2
(45) Date of Patent: Dec. 17, 2024

(54) ANTENNA DEVICE

(71) Applicant: SAMSUNG ELECTRO-MECHANICS CO., LTD., Suwon-si (KR)

(72) Inventors: Juhyoung Park, Suwon-si (KR); Daeki Lim, Suwon-si (KR); Jeongki Ryoo, Suwon-si (KR); Sungyong An, Suwon-si (KR); Jae Yeong Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 149 days.

(21) Appl. No.: 17/862,733

(22) Filed: Jul. 12, 2022

(65) Prior Publication Data

US 2023/0049220 A1 Feb. 16, 2023

(30) Foreign Application Priority Data

Aug. 11, 2021 (KR) ........................ 10-2021-0106227

(51) Int. Cl.
*H01Q 9/04* (2006.01)

(52) U.S. Cl.
CPC .................................... *H01Q 9/045* (2013.01)

(58) Field of Classification Search
CPC ...... H01Q 9/045; H01Q 1/2283; H01Q 21/08; H01Q 21/24; H01Q 21/28; H01Q 9/0457; H01Q 9/0407; H01Q 1/243; H01Q 9/0485
See application file for complete search history.

(56) References Cited

U.S. PATENT DOCUMENTS

| | | | | |
|---|---|---|---|---|
| 2012/0287019 | A1* | 11/2012 | Sudo ...................... | H01Q 9/045 343/904 |
| 2019/0089047 | A1 | 3/2019 | Hara et al. | |
| 2020/0412017 | A1 | 12/2020 | Park et al. | |
| 2021/0028548 | A1 | 1/2021 | Tsutsumi et al. | |
| 2021/0151853 | A1 | 5/2021 | Park et al. | |
| 2022/0255238 | A1* | 8/2022 | Yu ...................... | H01Q 21/0025 |

FOREIGN PATENT DOCUMENTS

| | | | |
|---|---|---|---|
| JP | 2019-57775 | A | 4/2019 |
| JP | 2021-22610 | A | 2/2021 |
| KR | 10-2021-0000967 | A | 1/2021 |
| KR | 10-2021-0061573 | A | 5/2021 |

* cited by examiner

*Primary Examiner* — Seung H Lee
(74) *Attorney, Agent, or Firm* — NSIP Law

(57) ABSTRACT

An antenna device is provided. The antenna device includes: a first dielectric layer; a second dielectric layer disposed on the first dielectric layer; a third dielectric layer disposed between the first dielectric layer and the second dielectric layer; a feed via configured to penetrate the first dielectric layer; a first feed pattern disposed between the first dielectric layer and the third dielectric layer; a second feed pattern disposed between the second dielectric layer and the third dielectric layer and configured to overlap the first feed pattern; and a patch antenna pattern disposed on the second dielectric layer and configured to overlap the first feed pattern and the second feed pattern, wherein a dielectric constant of the third dielectric layer is less than a dielectric constant of the first dielectric layer and a dielectric constant of the second dielectric layer.

19 Claims, 16 Drawing Sheets

ANTENNA DEVICE

CROSS-REFERENCE TO RELATED APPLICATIONS

This application claims the benefit under 35 USC § 119(a) of Korean Patent Application No. 10-2021-0106227, filed on Aug. 11, 2021, in the Korean Intellectual Property Office, the entire disclosure of which is incorporated herein by reference for all purposes.

BACKGROUND

1. Field

The following description relates to an antenna device.

2. Description of Related Art

Recently, millimeter wave (mmWave) communication including 5-generation (5G) communication has been implemented.

As portable electronic devices are developed, the size of the screen that is a display area of the electronic device increases, and the size of a bezel that is a non-display area in which an antenna is disposed is reduced, such that the area of the region in which the antenna may be installed is also reduced.

The above information disclosed in this Background section is only for enhancement of understanding of the background of the described technology, and therefore it may contain information that does not form the prior art that is already known in this country to a person of ordinary skill in the art.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, an antenna device includes a first dielectric layer; a second dielectric layer disposed above the first dielectric layer; a third dielectric layer disposed between the first dielectric layer and the second dielectric layer; a feed via configured to penetrate the first dielectric layer; a first feed pattern disposed between the first dielectric layer and the third dielectric layer; a second feed pattern disposed between the second dielectric layer and the third dielectric layer and configured to overlap the first feed pattern; and a patch antenna pattern disposed on the second dielectric layer and configured to overlap the first feed pattern and the second feed pattern, wherein a dielectric constant of the third dielectric layer is less than a dielectric constant of the first dielectric layer and a dielectric constant of the second dielectric layer.

The first dielectric layer includes a first side and a second side, the second dielectric layer includes a third side and a fourth side which face each other, the first feed pattern is disposed on the second side of the first dielectric layer, and the second feed pattern is disposed on the third side of the second dielectric layer.

The second side of the first dielectric layer may face the third side of the second dielectric layer with the third dielectric layer disposed therebetween.

The third dielectric layer may include a polymer layer, and the polymer layer is configured to have adhesiveness.

A planar shape of the first feed pattern may be substantially the same as a planar shape of the second feed pattern.

A third feed pattern may be configured to overlap the first feed pattern, and may be configured to connect to the feed via.

The third feed pattern may be disposed on a first side of the first dielectric layer.

A planar shape of the third feed pattern may be substantially the same as a planar shape of the first feed pattern and a planar shape of the second feed pattern.

In a general aspect, an antenna device includes a first dielectric layer; a second dielectric layer disposed above the first dielectric layer; a feed via configured to penetrate the first dielectric layer; a first feed pattern disposed on the first dielectric layer and connected to the feed via; a second feed pattern disposed on the first dielectric layer and configured to overlap the first feed pattern; a third feed pattern disposed below the first dielectric layer and configured to connect to the feed via; and a patch antenna pattern disposed on the second dielectric layer and configured to overlap the first feed pattern, the second feed pattern, and the third feed pattern.

A planar shape of the first feed pattern may be substantially the same as a planar shape of the second feed pattern.

The third feed pattern may be configured to overlap the first feed pattern, and a planar shape of the third feed pattern may be substantially the same as a planar shape of the first feed pattern and a planar shape of the second feed pattern.

A third dielectric layer may be disposed between the first feed pattern and the second feed pattern.

The first dielectric layer may include a first side and a second side which face each other, the second dielectric layer may include a third side and a fourth side which face each other, the first feed pattern may be disposed on the second side of the first dielectric layer, and the second feed pattern may be disposed on the third side of the second dielectric layer.

The second side of the first dielectric layer may face the third side of the second dielectric layer with the third dielectric layer disposed therebetween.

A dielectric constant of the third dielectric layer may be less than a dielectric constant of the first dielectric layer and a dielectric constant of the second dielectric layer.

The third dielectric layer may include a polymer, and the polymer layer may be configured to have adhesiveness.

In a general aspect, an electronic device includes a communication modem; and an antenna device, connected to the communication modem, wherein the antenna device includes a first dielectric layer of a first material; a second dielectric layer of a second material; a third dielectric layer, disposed between the first dielectric layer and the second dielectric layer, and comprising a third material that is different from the first material and the second material; a first feed pattern and a second feed pattern disposed on a side of the first dielectric layer; a third feed pattern and a fourth feed pattern disposed on a side of the second dielectric layer, and a first feed via and a second feed via disposed in the first dielectric layer, and respectively configured to transfer electrical signals to the first feed pattern and the second feed pattern.

The material of the third dielectric layer may include a polymer with adhesiveness.

The electronic device may include a patch antenna pattern disposed on the second dielectric layer, and configured to overlap the first feed pattern, the second feed pattern, the third feed pattern, and the fourth feed pattern.

Other features and aspects will be apparent from the following detailed description, the drawings, and the claims.

Figure 1:
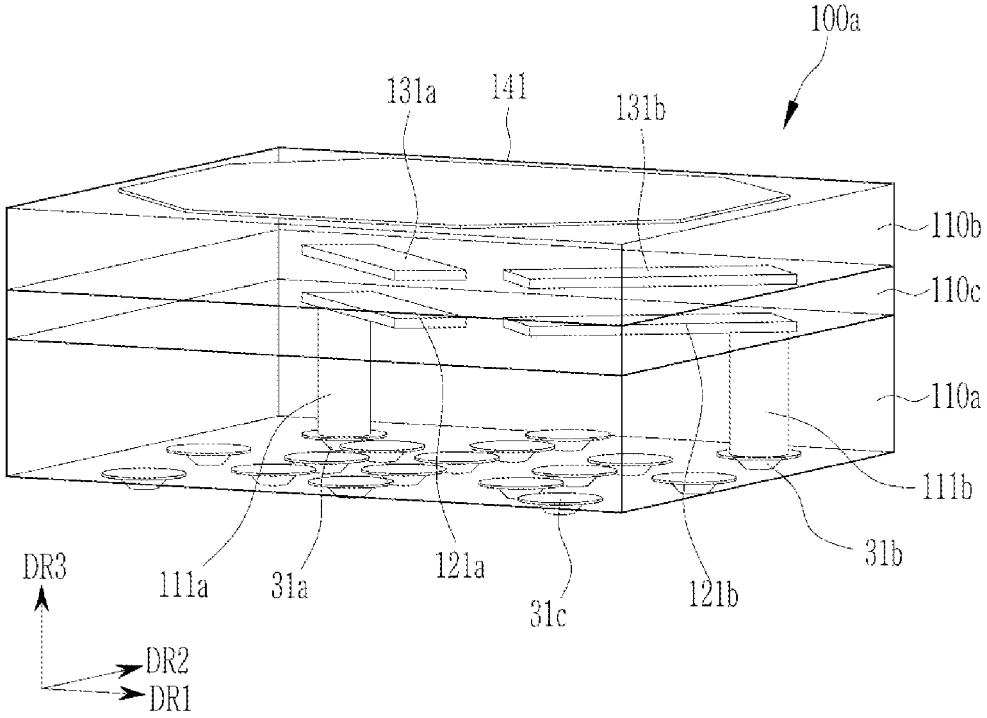
FIG. 1 illustrates a perspective view of an example antenna device, in accordance with one or more embodiments.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The size and thickness of each configuration shown in the drawings are arbitrarily shown for better understanding and ease of description, but the embodiments are not limited thereto. In the drawings, the thickness of layers, films, panels, regions, etc., are enlarged for clarity. The thicknesses of some layers and areas are exaggerated for convenience of explanation.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

The phrase "in a plan view" means viewing an object portion from the top, and the phrase "in a cross-sectional view" means viewing a cross-section of which the object portion is vertically cut from the side.

In addition, terms such as first, second, A, B, (a), (b), and the like may be used herein to describe components. Each of these terminologies is not used to define an essence, order, or sequence of a corresponding component but used merely to distinguish the corresponding component from other component(s).

Unless otherwise defined, all terms, including technical and scientific terms, used herein have the same meaning as commonly understood by one of ordinary skill in the art to which this disclosure pertains and after an understanding of the disclosure of this application. Terms, such as those defined in commonly used dictionaries, are to be interpreted as having a meaning that is consistent with their meaning in the context of the relevant art and the disclosure of this application, and are not to be interpreted in an idealized or overly formal sense unless expressly so defined herein.

Various embodiments and variations will now be described in detail with reference to accompanying drawings.

An antenna device, in accordance with one or more embodiments, will now be described with reference to FIG. 1 to FIG. 6. FIG. 1 illustrates a perspective view of an example antenna device, in accordance with one or more embodiments, FIG. 2 illustrates a cross-sectional view of an example antenna device of FIG. 1, FIG. 3 to FIG. 5 illustrate top plan views of a part of an example antenna device of FIG. 1, and FIG. 6 illustrate a cross-sectional view of a part of an example antenna device of FIG. 1.

Figure 2:
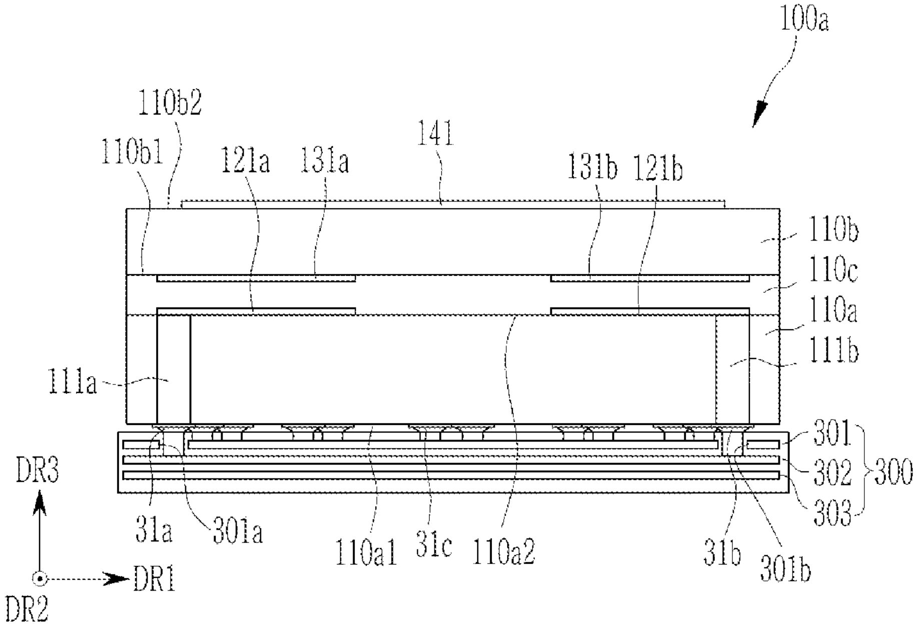
FIG. 2 illustrates a cross-sectional view of an example antenna device of FIG. 1.

Referring to FIG. 1 and FIG. 2, the antenna device 100*a*, in accordance with one or more embodiments, includes: a first dielectric layer 110*a*; a second dielectric layer 110*b*; a third dielectric layer 110*c* positioned between the first dielectric layer 110*a* and the second dielectric layer 110*b*; a first feed via 111*a*; a second feed via 111*b*; a first feed pattern 121*a*; and a second feed pattern 121*b* respectively connected to the first feed via 111*a* and the second feed via 111*b*; a third feed pattern 131*a* and a fourth feed pattern 131*b* overlapping the respective first feed pattern 121*a* and the second feed pattern 121*b*; and a patch antenna pattern 141.

In an example, the first dielectric layer 110*a* and the second dielectric layer 110*b* may expand in a first direction (DR1), a second direction (DR2), and a third direction (DR3) that is perpendicular to the first direction (DR1) and the second direction (DR2).

The second dielectric layer 110*b* may be positioned on the first dielectric layer 110*a* in the third direction (DR3), and the third dielectric layer 110*c* may be positioned between the first dielectric layer 110*a* and the second dielectric layer 110*b*.

The first dielectric layer 110*a* and the second dielectric layer 110*b* may include a ceramic material having a greater dielectric constant than the dielectric constant of a general insulation layer of the printed circuit board (PCB). For example, the first dielectric layer 110*a* and the second dielectric layer 110*b* may formed with a material that has a relatively high dielectric constant in a like manner of a ceramic-based material such as a low temperature co-fired ceramic (LTCC) or a glass-based material, and may further contain at least one of magnesium (Mg), silicon (Si), aluminum (Al), calcium (Ca), and titanium (Ti), so they may have a greater dielectric constant or stronger durability. In a non-limiting example, the first dielectric layer 110*a* and the second dielectric layer 110*b* may include $Mg_2SiO_4$, $MgAlO_4$, and $CaTiO_3$.

The third dielectric layer 110*c* may include a material that is different from a material of the first dielectric layer 110*a* and the second dielectric layer 110*b*. In an example, the third dielectric layer 110*c* may include a polymer with adhesiveness, may be positioned between the first dielectric layer 110*a* and the second dielectric layer 110*b*, and may combine, or connect, the first dielectric layer 110*a* and the second dielectric layer 110*b*.

The third dielectric layer 110*c* may include a ceramic material having a dielectric constant that is less than the dielectric constants of the first dielectric layer 110*a* and the second dielectric layer 110*b* to form a dielectric medium boundary surface between the first dielectric layer 110*a* and the second dielectric layer 110*b*, may include a material with high flexibility such as a liquid crystal polymer (LCP) or a polyimide, or may include a material such as an epoxy resin or Teflon to have strong durability and high adhesiveness.

The first dielectric layer 110*a* may have a first side 110*a*1 and a second side 110*a*2 facing each other in the third direction (DR3), and the second dielectric layer 110*b* may have a first side 110*b*1 and a second side 110*b*2 facing each other in the third direction (DR3). The second side 110*a*2 of the first dielectric layer 110*a* may face the first side 110*b*1 of the second dielectric layer 110*b* in the third direction (DR3), and the third dielectric layer 110*c* may be inserted between the second side 110*a*2 of the first dielectric layer 110*a* and the first side 110*b*1 of the second dielectric layer 110*b*.

A plurality of connectors 31*a*, 31*b*, and 31*c* may be attached to the first side 110*a*1 of the first dielectric layer 110*a*, and the first feed pattern 121*a* and the second feed pattern 121*b* may be positioned on the second side 110*a*2 of the first dielectric layer 110*a*.

Figure 3:
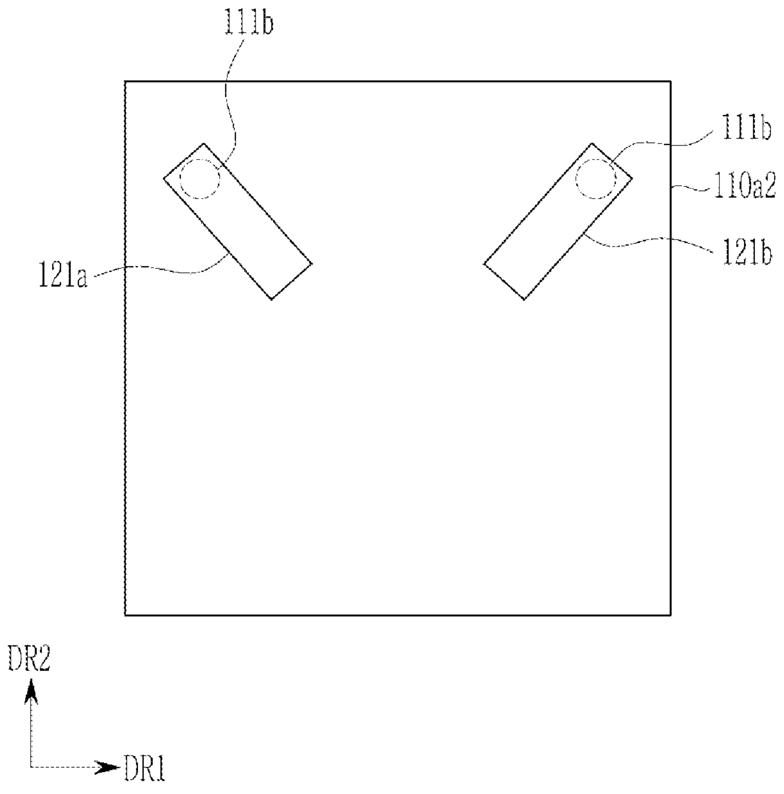
FIG. 3, FIG. 4, and FIG. 5 illustrate top plan views of part of an example antenna device of FIG. 1.

Referring to FIG. 1, FIG. 2, and FIG. 3, the first feed via 111*a* and the second feed via 111*b* may penetrate the first dielectric layer 110*a*, and the first feed via 111*a* and the second feed via 111*b* may be connected to the first feed pattern 121*a* and the second feed pattern 121*b* positioned on the second side 110*a*2 of the first dielectric layer 110*a*. Accordingly, the first feed pattern 121*a* and the second feed pattern 121*b* may be respectively connected to the first feed via 111*a* and the second feed via 111*b*, and may respectively receive electrical signals from the first feed via 111*a* and the second feed via 111*b*.

Figure 4:
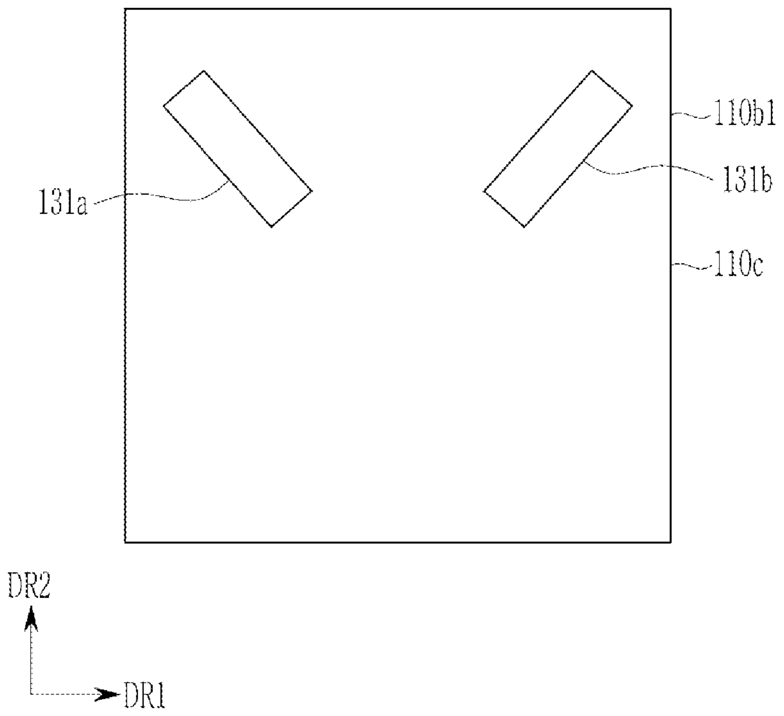

Referring to FIG. 1, FIG. 2, and FIG. 4, a third feed pattern 131*a* and a fourth feed pattern 131*b* may be positioned on the first side 110*b*1 of the second dielectric layer 110*b*.

The third feed pattern 131*a* and the fourth feed pattern 131*b* positioned on the first side 110*b*1 of the second dielectric layer 110*b* may have a same planar shape as the first feed pattern 121*a* and the second feed pattern 121*b*, and may have substantially a same size.

The third feed pattern 131*a* and the fourth feed pattern 131*b* may respectively overlap the first feed pattern 121*a* and the second feed pattern 121*b* with the third dielectric layer 110*c* interposed therebetween in the third direction (DR3).

Figure 5:
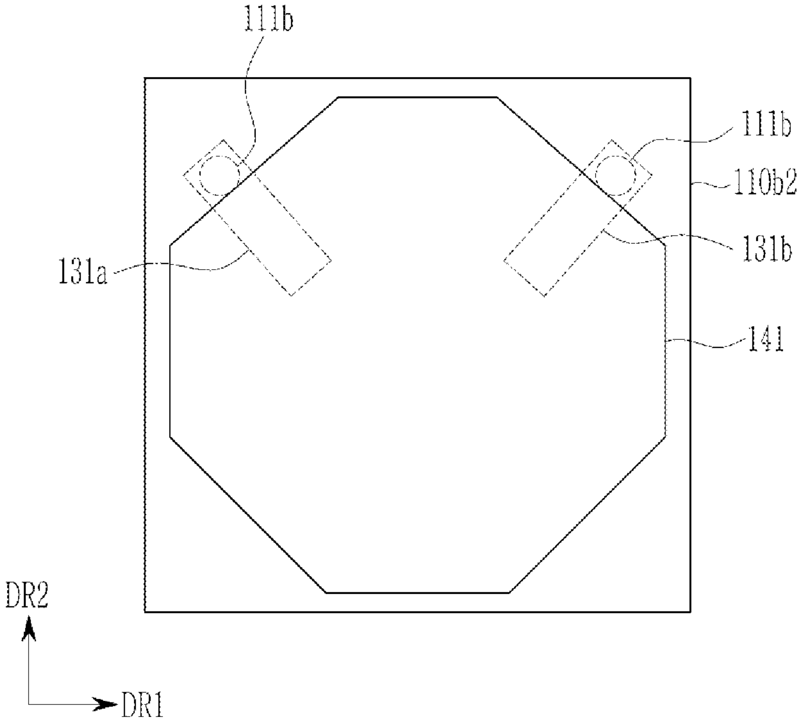
Figure 6:
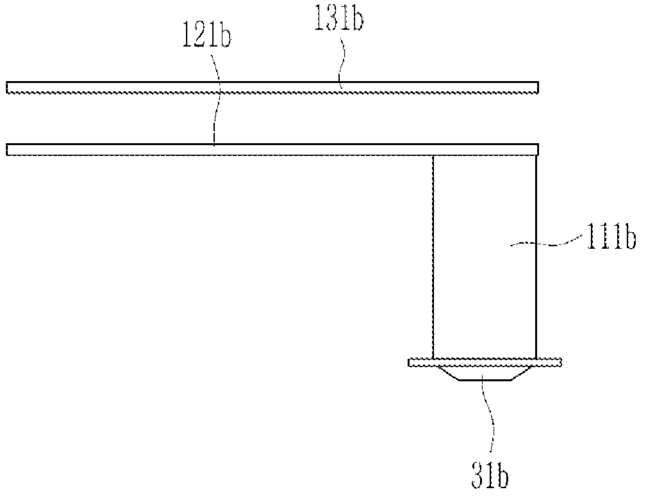
FIG. 6 illustrates a cross-sectional view of part of an example antenna device of FIG. 1.

Referring to FIG. 1, FIG. 2, and FIG. 5, a patch antenna pattern 141 may be positioned on the second side 110*b*2 of the second dielectric layer 110*b*.

The patch antenna pattern 141 may overlap the first feed pattern 121*a* and the second feed pattern 121*b* respectively connected to the first feed via 111*a* and the second feed via 111*b*, and the third feed pattern 131*a* and the fourth feed pattern 131*b* overlapping the first feed pattern 121*a* and the second feed pattern 121*b*.

As illustrated in FIG. 2, the antenna device 100*a*, in accordance with one or more embodiments, may be connected to a connecting member 300 through the connectors 31*a*, 31*b*, and 31*c* attached to the first side 110*a*1 of the first dielectric layer 110*a*. The connectors 31*a*, 31*b*, and 31*c* may have a structure such as a solder ball, a pin, a land, or a pad.

The connecting member 300 may include a ground plane 301 and a plurality of metal layers 302 and 303.

The ground plane 301 may have penetration holes 301*a* and 301*b*, and the first feed via 111*a* and the second feed via 111*b* may pass through the ground plane 301 through the penetration holes 301*a* and 301*b* of the ground plane 301 and may be connected to another layer of the connecting member 300 to receive an electrical signal.

Referring to FIG. 1 to FIG. 5 and FIG. 6, the electrical signal applied to the first feed via 111*a* and the second feed via 111*b* through the connecting member 300 may be transmitted to the first feed pattern 121*a* and the second feed pattern 121*b* connected to the first feed via 111*a* and the second feed via 111*b*, and the first feed pattern 121*a* and the second feed pattern 121*b* to which the electrical signal is applied may be coupled to the patch antenna pattern 141 and may transmit the electrical signal to the patch antenna pattern 141.

In this instance, the third feed pattern 131*a* and the fourth feed pattern 131*b* overlapping the first feed pattern 121*a* and the second feed pattern 121*b* may be coupled to the first feed pattern 121*a* and the second feed pattern 121*b* and may be coupled to the patch antenna pattern 141. As the third feed pattern 131*a* and the fourth feed pattern 131*b* are additionally disposed among the first feed pattern 121*a*, the second feed pattern 121*b*, and the patch antenna pattern 141, the patch antenna pattern 141 may be coupled to the first feed pattern 121*a* and the second feed pattern 121*b* to receive the electrical signal and may be coupled to the third feed pattern 131*a* and the fourth feed pattern 131*b* to receive the electrical signal.

The patch antenna pattern 141 may be coupled to the first feed pattern 121*a* and the second feed pattern 121*b* connected to the first feed via 111*a* and the second feed via 111*b*, and the third feed pattern 131*a* and the fourth feed pattern 131*b* coupled to the first feed pattern 121*a* and the second feed pattern 121*b* and may transmit/receive RF signals. In an example, the patch antenna pattern 141 may transmit/receive a first polarization RF signal through coupling with the first feed via 111*a*, the first feed pattern 121*a*, and the third feed pattern 131*a*, and the patch antenna pattern 141 may transmit/receive a second polarization RF signal through coupling with the second feed via 111*b*, the second feed pattern 121*b*, and the fourth feed pattern 131*b*.

As described above, the patch antenna pattern 141 may be coupled to the first feed pattern 121*a* and the second feed pattern 121*b* to receive electrical signals and may be coupled to the third feed pattern 131*a* and the fourth feed pattern 131*b* to receive electrical signals. The third feed pattern 131*a* and the fourth feed pattern 131*b* additionally coupled to the patch antenna pattern 141 may provide additional impedance to the patch antenna pattern 141, and hence, a bandwidth of the RF signal transmitted/received through the patch antenna pattern 141 may be expanded without increasing the size of the antenna device 100*a*.

The third dielectric layer 110*c* positioned among the first feed pattern 121*a*, the second feed pattern 121*b*, and the patch antenna pattern 141 has a different dielectric constant from the first dielectric layer 110*a* and the second dielectric layer 110*b*, so the third dielectric layer 110*c* may form a dielectric medium boundary surface between the first dielectric layer 110*a* and the second dielectric layer 110*b*, and the dielectric medium boundary surface may refract a propagation direction of the RF signal to concentrate a radiation pattern forming direction of the antenna device 100*a* in the third direction (DR3).

Referring to FIG. 5, the patch antenna pattern 141 may have a planar shape of a polygon, and in an example, may have a planar shape of an octagon. A surface current flowing to the patch antenna pattern 141 may flow along an edge of the patch antenna pattern 141, and the patch antenna pattern 141 has a planar shape of a polygon, so a current path of the surface current flowing to the patch antenna pattern 141 may increase without increasing the size of the patch antenna pattern 141, and the bandwidth of the RF signal transmitted/received through the patch antenna pattern 141 may be expanded without increasing the size of the antenna device.

Regarding the example antenna device 100*a*, in accordance with one or more embodiments, the bandwidth of the antenna device may be increased without increasing the antenna size, so the antenna device 100*a*, in accordance with one or more embodiments may be disposed in a narrow region, and performance may be increased.

According to the example described with reference to FIG. 1 to FIG. 6, two feed vias 111*a* and 111*b* have been described to be included, and without being limited thereto, the antenna device 100*a* may include a feed pattern connected to at least one feed via, and an additional feed pattern overlapping the feed pattern.

Figure 7:
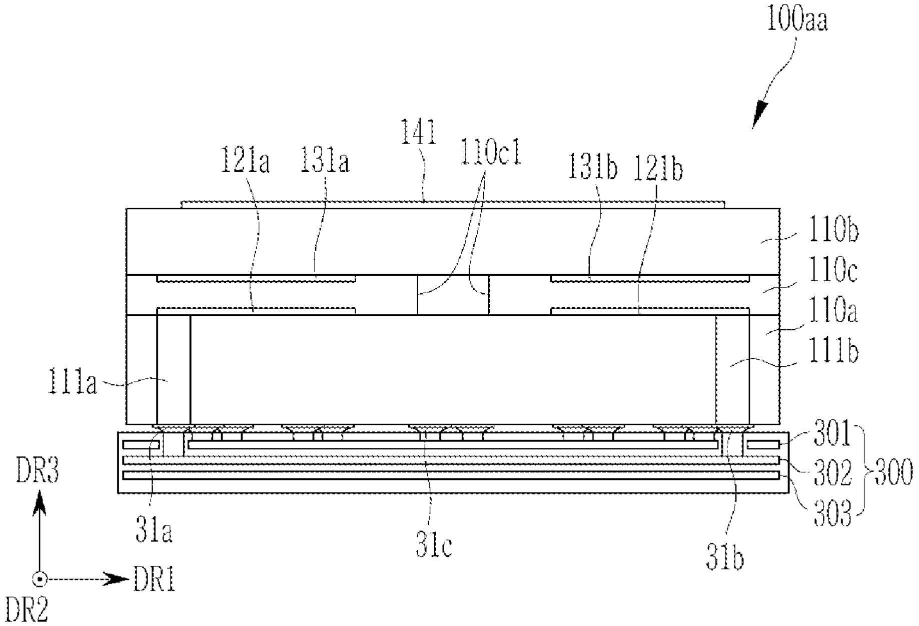
FIG. 7 illustrates a cross-sectional view of an example antenna device, in accordance with one or more embodiments.

An example antenna device 100*aa*, in accordance with one or more embodiments, will now be described with reference to FIG. 7. FIG. 7 illustrates a cross-sectional view of an example antenna device, in accordance with one or more embodiments.

Referring to FIG. 7, the example antenna device 100*aa*, in accordance with one or more embodiments, is similar to the example antenna device 100*a*, in accordance with one or more embodiments described with reference to FIG. 1 to FIG. 6. No detailed descriptions on the same constituent elements will be provided.

However, regarding the example antenna device 100*aa* according to the present embodiment, differing from the above-described example antenna device 100*a* according to an embodiment, the third dielectric layer 110*c* may have an air cavity 110*c*1 in a center thereof, and air may be filled in the air cavity 110*c*1. Accordingly, the dielectric constant of the third dielectric layer 110*c* may become less than the dielectric constants of the first dielectric layer 110*a* and the second dielectric layer 110*b*.

Figure 8:
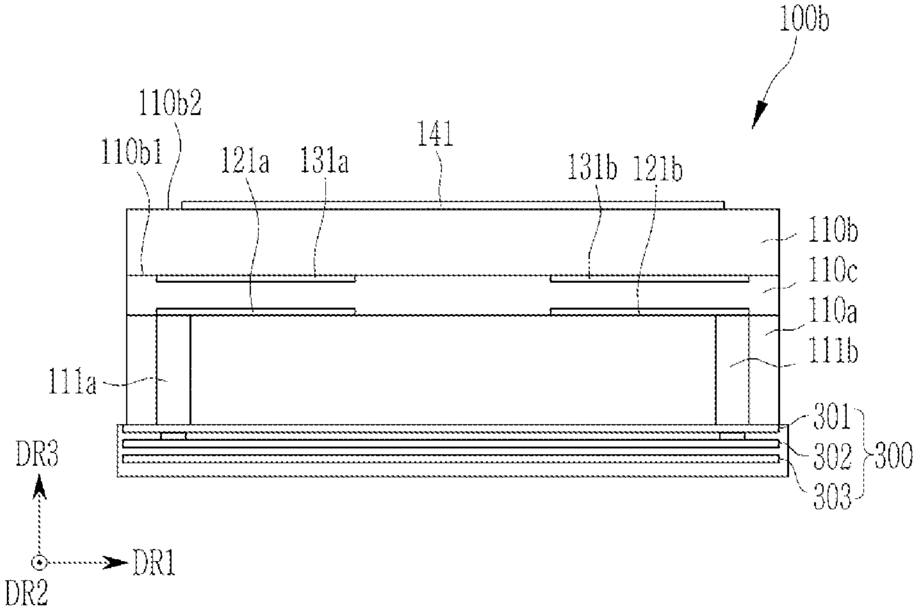
FIG. 8 illustrates a cross-sectional view on an example antenna device, in accordance with one or more embodiments.

An example antenna device 100*b*, in accordance with one or more embodiments will now be described with reference to FIG. 8. FIG. 8 shows a cross-sectional view on an antenna device, in accordance with one or more embodiments.

Referring to FIG. 8, the example antenna device 100*b*, in accordance with one or more embodiments, is similar to the antenna device 100*a* according to an embodiment described with reference to FIG. 1 to FIG. 6. No detailed descriptions on the same constituent elements will be provided.

However, regarding the example antenna device 100*b* according to the present embodiment, differing from the above-described example antenna device 100*a* according to an embodiment, the connecting member 300 may be positioned below the first dielectric layer 110*a*, and the antenna device 100*b* may be connected to the ground plane 301 without a plurality of connectors 31*c*. The first feed via 111*a* and the second feed via 111*b* may pass through the ground plane through a penetration hole of the ground plane 301 without a plurality of connectors 31*a* and 31*b*, may be connected to another layer of the connecting member 300, and may receive the electrical signal.

As described, the example antenna device 100*b* according to the present embodiment may be integrally formed with the connecting member 300 on the connecting member 300, differing from the above-described antenna device 100*a* according to an embodiment.

Many characteristics of the antenna device 100*a* according to an embodiment described with reference to FIG. 1 to FIG. 6 and the antenna device 100*aa* according to an embodiment described with reference to FIG. 7 are applicable to the antenna device 100*b* according to the present embodiment.

Figure 9:
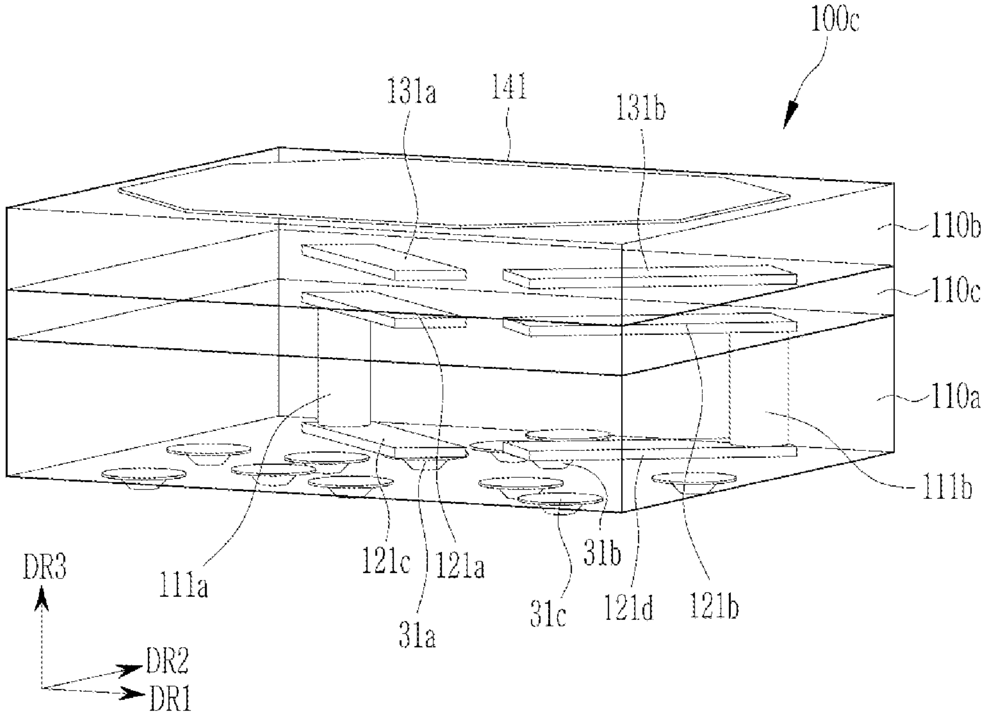
FIG. 9 illustrates a perspective view of an example antenna device, in accordance with one or more embodiments.

An antenna device 100*c*, in accordance with one or more embodiments, will now be described with reference to FIG. 9 to FIG. 11. FIG. 9 illustrates a perspective view on an example antenna device, in accordance with one or more embodiments, FIG. 10 shows a cross-sectional view on an example antenna device of FIG. 9, and FIG. 11 shows a cross-sectional view of part of an example antenna device of FIG. 9.

Figure 10:
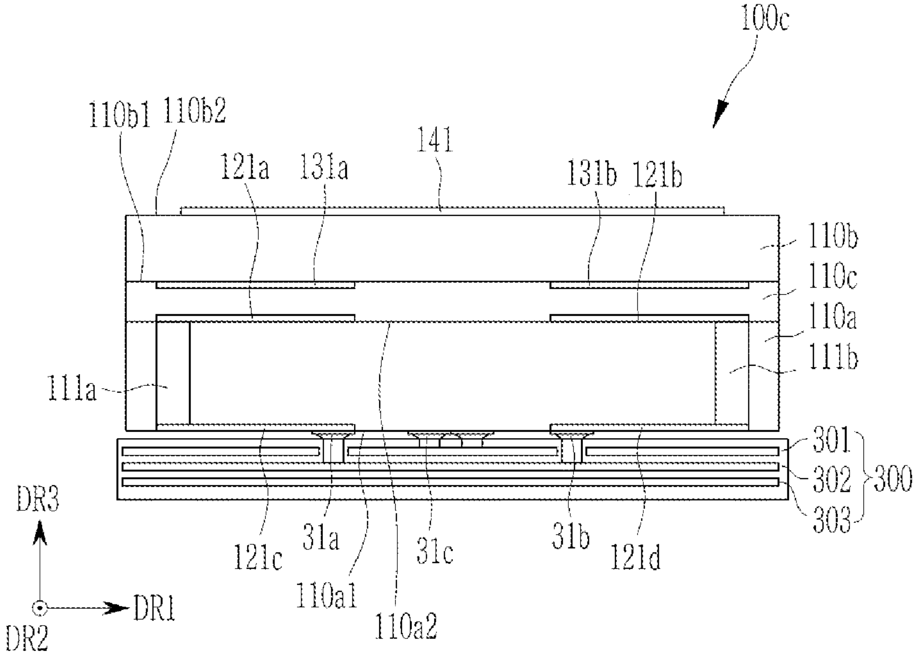
FIG. 10 illustrates a cross-sectional view of an example antenna device of FIG. 9.
Figure 11:
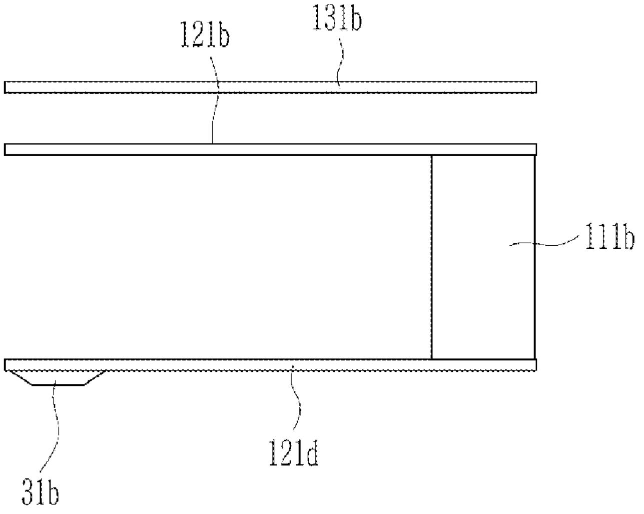
FIG. 11 illustrates a cross-sectional view of part of an example antenna device of FIG. 9.

Referring to FIG. 9 to FIG. 11, the example antenna device 100*c* according to the present embodiment is similar to the example antenna device 100*a* according to an embodiment described with reference to FIG. 1 to FIG. 6. No detailed descriptions on the same constituent elements will be provided.

The example antenna device 100*c*, in accordance with one or more embodiments, includes: a first dielectric layer 110*a*, a second dielectric layer 110*b*, a third dielectric layer 110*c* positioned between the first dielectric layer 110*a* and the second dielectric layer 110*b*, a first feed via 111*a*, a second feed via 111*b*, a first feed pattern 121*a* and a second feed pattern 121*b* respectively connected to the first feed via 111*a* and the second feed via 111*b*, a third feed pattern 131*a* and a fourth feed pattern 131*b* respectively overlapping the first feed pattern 121*a* and the second feed pattern 121*b*, and a patch antenna pattern 141.

Differing from the example antenna device 100*a* according to one or more embodiments described with reference to FIG. 1 to FIG. 6, the example antenna device 100*c* according to the present embodiment may further include a fifth feed pattern 121*c* and a sixth feed pattern 121*d*.

The first dielectric layer 110*a* may have a first side 110*a*1 and a second side 110*a*2 facing each other in the third direction (DR3), and the second dielectric layer 110*b* may have a first side 110*b*1 and a second side 110*b*2 facing each other in the third direction (DR3). The second side 110*a*2 of the first dielectric layer 110*a* may face the first side 110*b*1 of the second dielectric layer 110*b* in the third direction (DR3), and the third dielectric layer 110*c* may be inserted or interposed between the second side 110*a*2 of the first dielectric layer 110*a* and the first side 110*b*1 of the second dielectric layer 110*b*.

The fifth feed pattern 121*c* and the sixth feed pattern 121*d* may be positioned on the first side 110*a*1 of the first dielectric layer 110*a*, and a plurality of connectors 31*a*, 31*b*, and 31*c* may be attached to the first side 110*a*1 of the first dielectric layer 110*a*.

The first feed via 111*a* and the second feed via 111*b* may penetrate the first dielectric layer 110*a*, and the first feed via 111*a* and the second feed via 111*b* may be connected respectively to the fifth feed pattern 121*c* and the sixth feed pattern 121*d* positioned on the first side 110*a*1 of the first dielectric layer 110*a* and may be connected respectively to the first feed pattern 121*a* and the second feed pattern 121*b* positioned on the second side 110*a*2 of the first dielectric layer 110*a*.

The first feed pattern 121*a*, the second feed pattern 121*b*, the fifth feed pattern 121*c*, and the sixth feed pattern 121*d* may be connected respectively to the first feed via 111*a* and the second feed via 111*b*, and may receive electrical signals from the first feed via 111*a* and the second feed via 111*b*.

The third feed pattern 131*a* and the fourth feed pattern 131*b* positioned on the first side 110*b*1 of the second dielectric layer 110*b* may overlap the first feed pattern 121*a* and the second feed pattern 121*b*.

The third feed pattern 131*a* and the fourth feed pattern 131*b*, respectively overlapping the first feed pattern 121*a* and the second feed pattern 121*b*, may be coupled to the first feed pattern 121*a* and the second feed pattern 121*b*, and may be coupled to the patch antenna pattern 141. As the third feed pattern 131*a* and the fourth feed pattern 131*b* are additionally disposed among the first feed pattern 121*a*, the second feed pattern 121*b*, and the patch antenna pattern 141 as described above, and the patch antenna pattern 141 may be coupled to the first feed pattern 121*a* and the second feed pattern 121*b* to receive the electrical signals and may be coupled to the third feed pattern 131*a* and the fourth feed pattern 131*b* to receive the electrical signals.

The patch antenna pattern 141 of the antenna device 100*c*, in accordance with one or more embodiments, may be coupled to the first feed pattern 121*a* and the second feed pattern 121*b* connected to the first feed via 111*a*, the second feed via 111*b*, the third feed pattern 131*a*, and the fourth feed pattern 131*b* coupled to the first feed pattern 121*a* and the second feed pattern 121*b* and may transmit/receive the RF signals. The third feed pattern 131*a* and the fourth feed pattern 131*b* additionally coupled to the patch antenna pattern 141 may provide additional impedance to the patch antenna pattern 141, and by this, the bandwidth of the RF signal transmitted/received through the patch antenna pattern 141 may be expanded without increasing the size of the antenna device 100*b*.

The example antenna device 100*c*, in accordance with one or more embodiments, may further include a fifth feed pattern 121*c* and a sixth feed pattern 121*d* connected to the first feed via 111*a* and the second feed via 111*b*, so the current transmitted from the connecting member 300 passes through the fifth feed pattern 121*c* and the sixth feed pattern 121*d* and is transmitted to the first feed via 111*a* and the second feed via 111*b*. Therefore, the path of the current transmitted through the first feed via 111*a* and the second feed via 111*b* may increase, and hence, the bandwidth of the RF signal transmitted/received through the patch antenna pattern 141 may be expanded without increasing the size of the antenna device.

As described above, the third dielectric layer 110*c* positioned among the first feed pattern 121*a*, the second feed pattern 121*b*, and the patch antenna pattern 141 may have a different dielectric constant from a dielectric constant of the first dielectric layer 110*a* and the second dielectric layer 110*b*, so the third dielectric layer 110*c* may form a dielectric medium boundary surface between the first dielectric layer 110*a* and the second dielectric layer 110*b*, and the dielectric medium boundary surface may refract the propagation direction of the RF signal to concentrate the radiation pattern forming direction of the antenna device 100*a* in the third direction (DR3).

The patch antenna pattern 141 may have a planar shape of a polygon, so the current path of the surface current flowing to the patch antenna pattern 141 may increase without increasing the size of the patch antenna pattern 141, and the bandwidth of the RF signal transmitted/received through the patch antenna pattern 141 may be expanded without increasing the size of the antenna device.

Regarding the example antenna device 100*c*, in accordance with one or more embodiments, the bandwidth of the example antenna device may be increased without increasing the antenna size, so the antenna device 100*b* according to the present embodiment may be disposed in a narrow region, and performance may be increased.

Many characteristics of the above-described example antenna devices 100*a*, 100*b*, and 100*c* according to an embodiment are applicable to the example antenna device 100*c*, in accordance with one or more embodiments.

Figure 12:
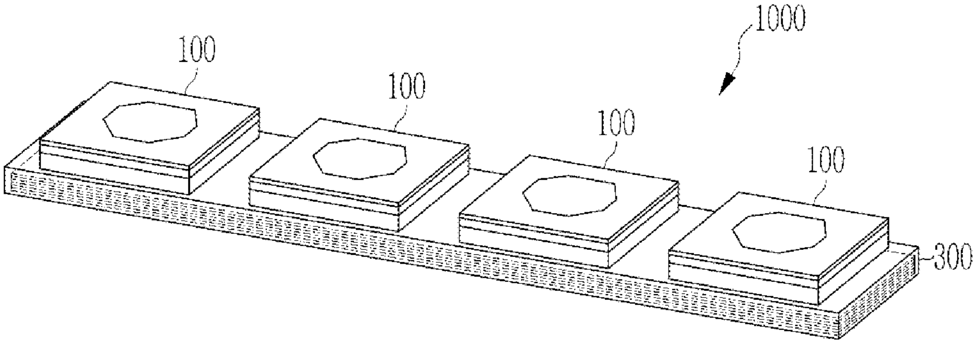
FIG. 12 illustrates a perspective view of an example antenna array, illustrating an arrangement of an example antenna device, in accordance with one or more embodiments.

An example antenna array 1000 including an antenna device, in accordance with one or more embodiments, will now be described with reference to FIG. 12. FIG. 12 illustrates a perspective view of an antenna array, showing an arrangement of an example antenna device, in accordance with one or more embodiments.

Referring to FIG. 12, a plurality of antenna devices 100 may be arranged in parallel in one direction on the connecting member 300.

A plurality of antenna devices 100 included in the antenna array 1000, in accordance with one or more embodiments, may include the antenna device 100*a* according to an embodiment described with reference to FIG. 1 to FIG. 6, the antenna device 100*aa* according to an embodiment described with reference to FIG. 7, the antenna device 100*b* according to an embodiment described with reference to FIG. 8, or the antenna device 100*c* according to an embodiment described with reference to FIG. 9 to FIG. 11.

Many characteristics of the above-described antenna devices 100*a*, 100*aa*, 100*b*, and 100*c*, in accordance with one or more embodiments, are applicable to the antenna array 1000 according to the present embodiment.

Figure 13:
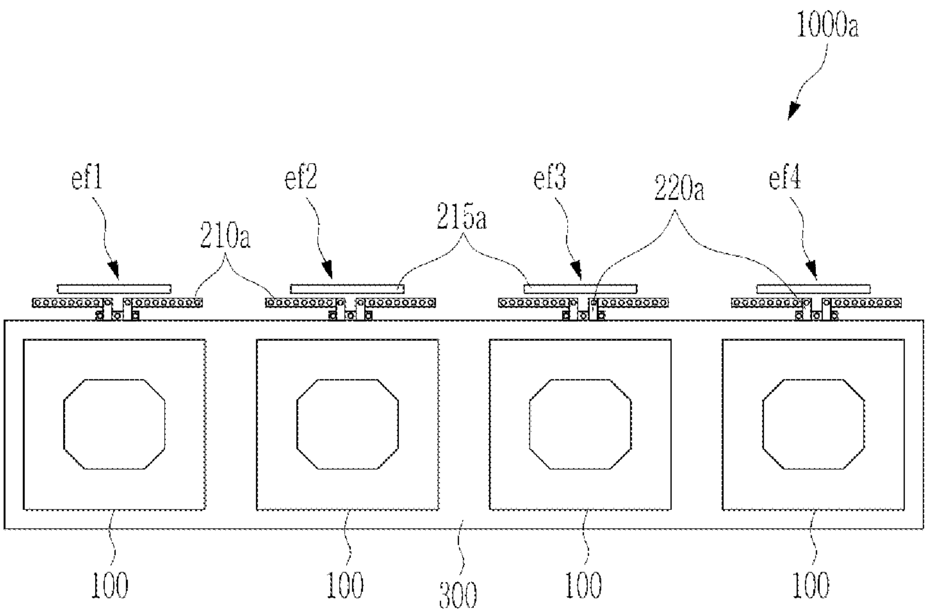
FIG. 13 illustrates a top plan view of an example antenna array, illustrating an arrangement of an example antenna device, in accordance with one or more embodiments.

An antenna array 1000*a* including an antenna device according to another embodiment will now be described with reference to FIG. 13. FIG. 13 illustrates a top plan view of an antenna array, showing an arrangement of an example antenna device, in accordance with one or more embodiments.

Referring to FIG. 13, a plurality of antenna devices 100 may be arranged in parallel in one direction on the connecting member 300.

The antenna devices 100 included in the antenna array 1000*a* according to the present embodiment may include the antenna device 100*a* according to an embodiment described with reference to FIG. 1 to FIG. 6, the antenna device 100*aa* according to an embodiment described with reference to FIG. 7, the antenna device 100*b* according to an embodiment described with reference to FIG. 8, or the antenna device 100*c* according to an embodiment described with reference to FIG. 9 to FIG. 11.

Referring to FIG. 13, the connecting member 300 of the antenna array 1000*a*, in accordance with one or more embodiments, may include a plurality of end fire antennas ef1, ef2, ef3, and ef4 arranged in parallel to the antenna devices 100, and may additionally form a radiation pattern of the RF signal in a horizontal direction, for example, the first direction (DR1) and/or the second direction (DR2).

The end fire antennas ef1, ef2, ef3, and ef4 may respectively include a plurality of end fire antenna patterns 210*a* and feedlines 220*a*, and may further include director patterns 215*a*.

Many characteristics of the above-described example antenna devices 100*a*, 100*aa*, 100*b*, and 100*c* according to an embodiment are applicable to the antenna array 1000*a* according to the present embodiment.

Figure 14:
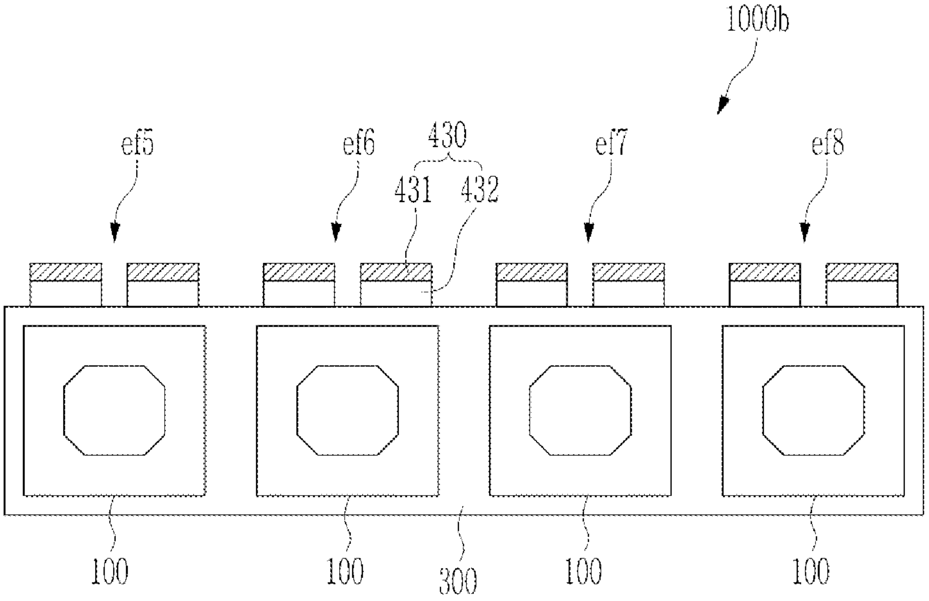
FIG. 14 illustrates a top plan view of an example antenna array, illustrating an arrangement of an example antenna device, in accordance with one or more embodiments.

An example antenna array 1000*b* including an antenna device, in accordance with one or more embodiments, will now be described with reference to FIG. 14. FIG. 14 illustrates a top plan view of an example antenna array, illustrating an arrangement of an example antenna device according to an embodiment.

Referring to FIG. 14, the example antenna devices 100 may be arranged in parallel in one direction on the connecting member 300.

The example antenna devices 100 included in the antenna array 1000*b* according to the present embodiment may include the example antenna device 100*a* according to an embodiment described with reference to FIG. 1 to FIG. 6, the example antenna device 100*aa* according to an embodiment described with reference to FIG. 7, the example antenna device 100*b* according to an embodiment described with reference to FIG. 8, or the example antenna device 100*c* according to an embodiment described with reference to FIG. 9 to FIG. 11.

Referring to FIG. 14, as the connecting member 300 of the antenna array 1000*b* according to the present embodiment may include a plurality of end fire antennas ef5, ef6, ef7, and ef8 arranged in parallel with the antenna devices 100, the radiation pattern of the RF signal may be formed in the horizontal direction, for example, the first direction (DR1) and/or the second direction (DR2).

The end fire antennas ef5, ef6, ef7, and ef8 may respectively include a radiator 431 and a dielectric material 432.

Many characteristics of the above-described example antenna devices 100*a*, 100*aa*, 100*b*, and 100*c* according to an embodiment are applicable to the example antenna array 1000*b* according to the present embodiment.

Figure 15:
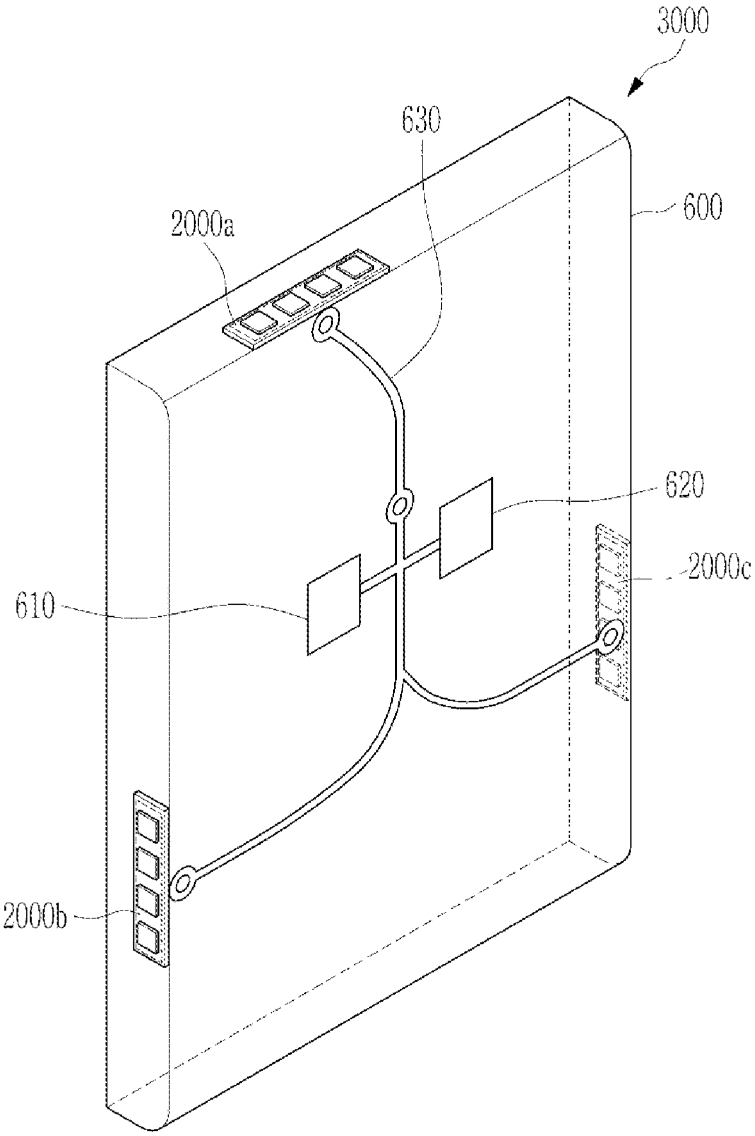
FIG. 15 illustrates a perspective view of an example electronic device including an example antenna device, in accordance with one or more embodiments.

An electronic device 3000 including an example antenna device, in accordance with one or more embodiments, will now be described with reference to FIG. 15. FIG. 15 illustrates a perspective view of an example electronic device including an example antenna device, in accordance with one or more embodiments.

Referring to FIG. 15, the example electronic device 3000, in accordance with one or more embodiments, includes a plurality of antenna arrays 2000*a*, 2000*b*, and 2000*c*, and the antenna arrays 2000*a*, 2000*b*, and 2000*c* are disposed on a set 600 of the electronic device 3000.

The electronic device 3000 may be, as non-limiting examples, a smart phone, a personal digital assistant, a digital video camera, a digital still camera, a network system, a computer, a monitor, a tablet, a laptop, a netbook, a television, a video game, a smart watch, and an automotive part, and it is not limited thereto.

In an example, the electronic device 3000 may have sides of a polygon, and the antenna arrays 2000*a*, 2000*b*, and 2000*c* may be disposed near at least some of a plurality of sides of the electronic device 3000.

A communication module or modem 610 and a baseband circuit 620 may be further disposed on the electronic device 3000, and the antenna arrays 2000*a*, 2000*b*, and 2000*c* may be electrically connected to the communication module or modem 610 and the baseband circuit 620 through a coaxial cable 630.

The communication module or modem 610 may include at least one of a memory chip such as a volatile memory (e.g., a DRAM), a non-volatile memory (e.g., a ROM), or a flash memory; an application processor chip such as a central processor (e.g., a CPU), a graphics signal processor (e.g., a GPU), a digital signal processor, an encoding processor, a microprocessor, and a microcontroller; and a logic chip such as an analog-digital converter or an application-specific IC (ASIC) for the purpose of performing digital signal processing.

The baseband circuit 620 may generate a base signal by performing analog-digital conversion, and amplifying, filtering, and frequency-converting the analog signal. The base signal input/output by the baseband circuit 620 may be transmitted to the antenna device through a cable. In an example, a base signal may be transmitted to an IC through an electrical connection structure, a core via, and a wire, and the IC may convert the base signal into a mmWave-band RF signal.

The antenna arrays 2000_a_, 2000_b_, and 2000_c_ may include the above-described antenna devices 100_a_, 100_aa_, 100_b_, and 100_c_ according to examples, and may be similar to the above-described example antenna arrays 1000, 1000_a_, and 1000_b_.

Figure 16:
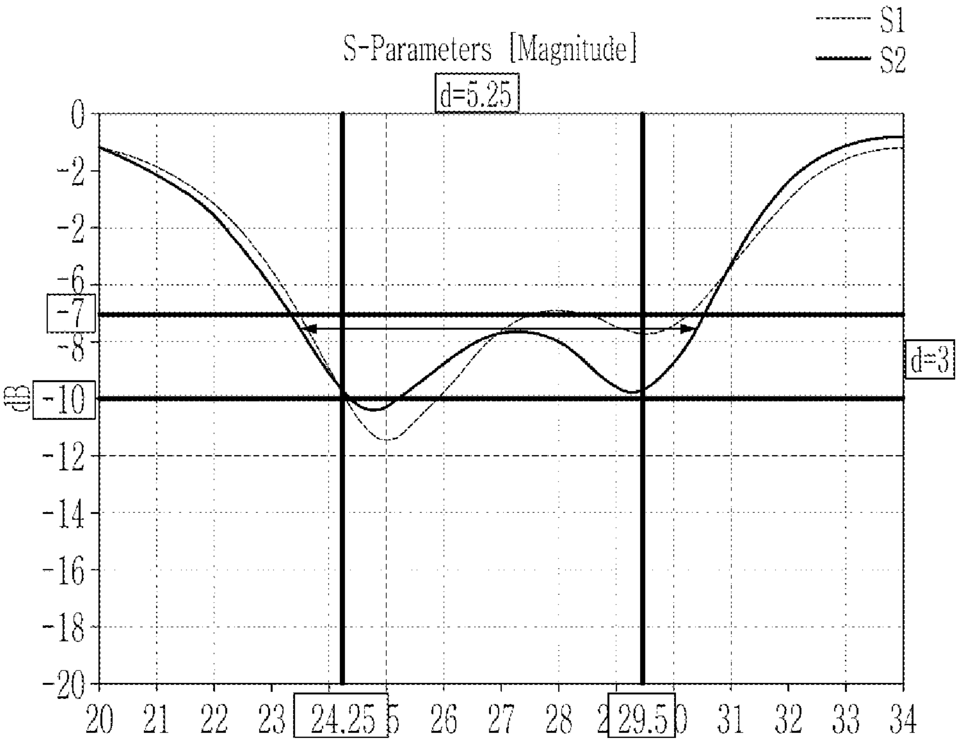
FIG. 16 illustrates a graph of results according to an experimental example.

An experimental example will now be described with reference to FIG. 16. FIG. 16 illustrates a graph of results according to an experimental example.

In the present experimental example, return losses with respect to frequencies may be measured for a first example (S1) including the first feed pattern 121_a_ and the second feed pattern 121_b_ connected to the first feed via 111_a_ and the second feed via 111_b_ and not including the third feed pattern 131_a_ and the fourth feed pattern 131_b_, and a second example (S2) further including the third feed pattern 131_a_ and the fourth feed pattern 131_b_ overlapping the first feed pattern 121_a_ and the second feed pattern 121_b_ in addition to the first feed pattern 121_a_ and the second feed pattern 121_b_ connected to the first feed via 111_a_ and the second feed via 111_b_ in a like manner of the antenna devices 100_a_, 100_b_, and 100_c_ according to examples, and results are illustrated in FIG. 16.

Referring to FIG. 16, similar to the example antenna device 100_a_, 100_b_, and 100_c_ according to embodiments, it is found that the bandwidth of the second example (S2) further including the third feed pattern 131_a_ and the fourth feed pattern 131_b_ overlapping the first feed pattern 121_a_ and the second feed pattern 121_b_ in addition to the first feed pattern 121_a_ and the second feed pattern 121_b_ connected to the first feed via 111_a_ and the second feed via 111_b_ is wider than the bandwidth of the first case (S1).

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An antenna device, comprising:
a first dielectric layer;
a second dielectric layer disposed above the first dielectric layer;
a third dielectric layer disposed between the first dielectric layer and the second dielectric layer;
a feed via configured to penetrate the first dielectric layer;
a first feed pattern disposed between the first dielectric layer and the third dielectric layer;
a third feed pattern disposed between the second dielectric layer and the third dielectric layer and configured to overlap the first feed pattern; and
a patch antenna pattern disposed on the second dielectric layer and configured to overlap the first feed pattern and the third feed pattern,
wherein a dielectric constant of the third dielectric layer is less than a dielectric constant of the first dielectric layer and a dielectric constant of the second dielectric layer.

2. The antenna device of claim 1, wherein:
the first dielectric layer includes a first side and a second side,
the second dielectric layer includes a third side and a fourth side which face each other,
the first feed pattern is disposed on the second side of the first dielectric layer, and
the third feed pattern is disposed on the third side of the second dielectric layer.

3. The antenna device of claim 2, wherein:
the second side of the first dielectric layer faces the third side of the second dielectric layer with the third dielectric layer disposed therebetween.

4. The antenna device of claim 3, wherein:
the third dielectric layer comprises a polymer layer, and the polymer layer is configured to have adhesiveness.

5. The antenna device of claim 1, wherein:
a planar shape of the first feed pattern is substantially the same as a planar shape of the third feed pattern.

6. The antenna device of claim 1, further comprising:
a fifth feed pattern configured to overlap the first feed pattern, and configured to connect to the feed via.

7. The antenna device of claim 6, wherein:
the fifth feed pattern is disposed on a first side of the first dielectric layer.

8. The antenna device of claim 7, wherein:
a planar shape of the fifth feed pattern is substantially the same as a planar shape of the first feed pattern and a planar shape of the third feed pattern.

9. An antenna device, comprising:
a first dielectric layer;
a second dielectric layer disposed above the first dielectric layer;
a feed via configured to penetrate the first dielectric layer;
a first feed pattern disposed on the first dielectric layer and connected to the feed via;
a third feed pattern disposed on the second dielectric layer and configured to overlap the first feed pattern;
a fifth feed pattern disposed below the first dielectric layer and configured to connect to the feed via; and
a patch antenna pattern disposed on the second dielectric layer and configured to overlap the first feed pattern, the third feed pattern, and the fifth feed pattern.

10. The antenna device of claim 9, wherein:
a planar shape of the first feed pattern is substantially the same as a planar shape of the third feed pattern.

11. The antenna device of claim 10, wherein:
the fifth feed pattern is configured to overlap the first feed pattern, and
a planar shape of the fifth feed pattern is substantially the same as a planar shape of the first feed pattern and a planar shape of the third feed pattern.

12. The antenna device of claim 11, further comprising:
a third dielectric layer disposed between the first feed pattern and the third feed pattern.

13. The antenna device of claim 12, wherein:
the first dielectric layer includes a first side and a second side which face each other,
the second dielectric layer includes a third side and a fourth side which face each other,
the first feed pattern is disposed on the second side of the first dielectric layer, and the third feed pattern is disposed on the third side of the second dielectric layer.

14. The antenna device of claim 13, wherein:

the second side of the first dielectric layer faces the third side of the second dielectric layer with the third dielectric layer disposed therebetween.

15. The antenna device of claim 12, wherein:

a dielectric constant of the third dielectric layer is less than a dielectric constant of the first dielectric layer and a dielectric constant of the second dielectric layer.

16. The antenna device of claim 15, wherein:

the third dielectric layer comprises a polymer, and the polymer layer is configured to have adhesiveness.

17. An electronic device, comprising:

a communication modem; and an antenna device, connected to the communication modem, wherein the antenna device comprises:

a first dielectric layer of a first material;

a second dielectric layer of a second material;

a third dielectric layer, disposed between the first dielectric layer and the second dielectric layer, and comprising a third material that is different from the first material and the second material;

a first feed pattern and a second feed pattern disposed on a side of the first dielectric layer;

a third feed pattern and a fourth feed pattern disposed on a side of the second dielectric layer, and a first feed via and a second feed via disposed in the first dielectric layer, and respectively configured to transfer electrical signals to the first feed pattern and the second feed pattern.

18. The device of claim 17, wherein the material of the third dielectric layer comprises a polymer with adhesiveness.

19. The device of claim 17, further comprising a patch antenna pattern disposed on the second dielectric layer, and configured to overlap the first feed pattern, the second feed pattern, the third feed pattern, and the fourth feed pattern.

* * * * *